United States Patent Office

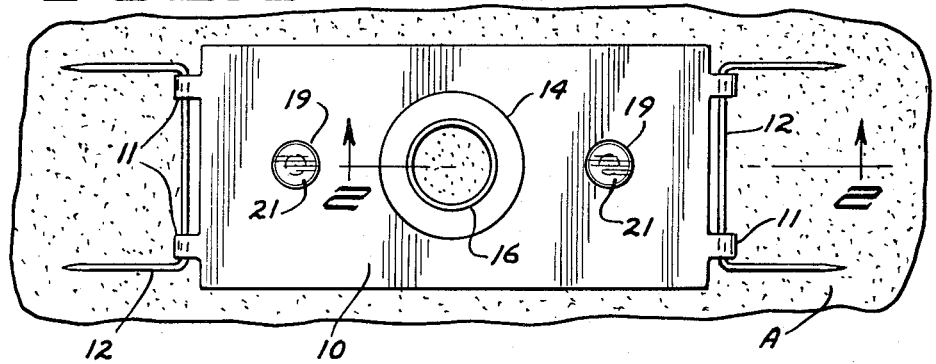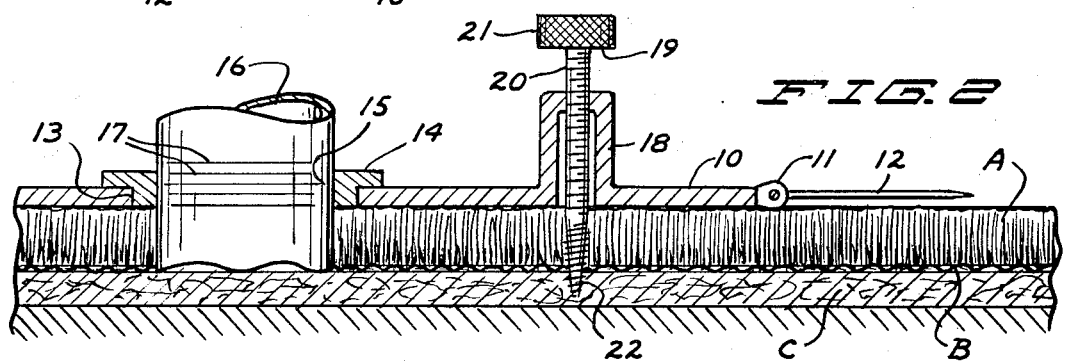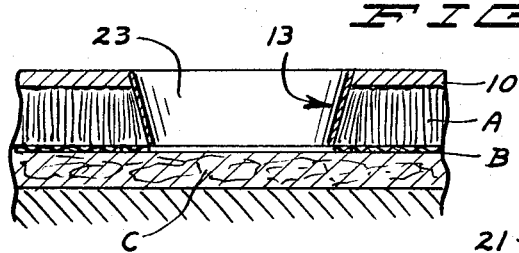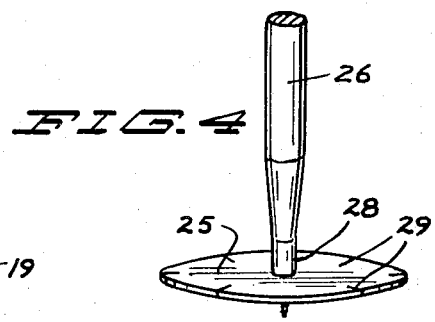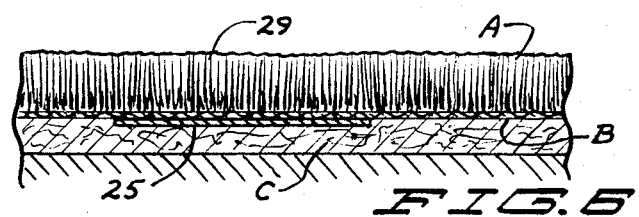

3,697,358
Patented Oct. 10, 1972

3,697,358
APPARATUS FOR REPAIRING DAMAGED CARPETING
Jacob A. Ronning, 3525 Irving Ave. S.,
Minneapolis, Minn. 55408
Original application July 27, 1967, Ser. No. 656,482, now Patent No. 3,558,386. Divided and this application Aug. 27, 1970, Ser. No. 67,541
Int. Cl. B32b 31/04, 31/18, 31/20
U.S. Cl. 156—514                                4 Claims

ABSTRACT OF THE DISCLOSURE

Apparatus for use in repairing spot damaged carpeting including a plate for disposition on the carpeting with an aperture exposing the damaged area and for guiding a cutting tool therethrough, with means attaching the plate to the carpeting to lift a portion of the same above the underlying floor to facilitate the passage of a member for securing a section of undamaged carpeting in the opening from which the damaged section has been cut.

---

This application is a division from my copending application Ser. No. 656,482, filed July 27, 1967, now U.S. Pat. No. 3,558,386, and the apparatus as herein disclosed was specifically designed for carrying out the method set forth and claimed in that application, which also discloses the apparatus to which this application is directed.

The particular method, as set forth in the parent application, relates to the repairing of spot damaged carpeting, and includes the steps of cutting and removing the damaged section, cutting an undamaged section corresponding in size, contour and color to the damaged section, lifting the carpeting around the opening from which the damaged section has been removed to create a space thereunder, inserting an adhesive sheet down through the opening and spreading it in said space, for binding contact with the base material adjacent the opening, lowering the lifted carpet portion to its initial position, and then transposing the section of undamaged carpeting into the opening previously occupied by the damaged section and pressing it into binding contact with the inserted adhesive sheet.

Essentially the present inventive concept embraces the use of a guide plate which is operative to assist the operator in cutting out damaged and undamaged sections of carpeting, by guiding the cutter employed; which is operative to serve as an indexing device in properly orienting the pile rows of the new section with that of the surrounding area; and which also functions to lift the carpeting the necessary height above the pad or floor to permit the insertion of the bonding disc. The complete operation further includes the employment of a truncoconical sleeve that is operative to hold the surrounding pile against encroachment into the cut area, while also serving to constrict the connecting disc while it is being moved down into its final position prior to insertion of the new plug; together with a novel form of spindle to which the disc is temporarily secured while being moved down into place.

Further objects and details of construction will be indicated during the description of the accompanying drawing, in which—

FIG. 1 is a plan view of the guide plate used in the present apparatus and method in its prone or cutting position on the carpeting being operated on.

FIG. 2 is an enlarged vertical section taken on the line 2—2 in FIG. 1.

FIG. 3 is a section corresponding to the left end portion of FIG. 2 but with the adapter ring and cutter removed, and with the guide sleeve inserted.

FIG. 4 is a perspective detail view of the spindle that is used for inserting the securing disc, and with a disc attached in place thereon.

FIG. 5 is a sectional elevation corresponding generally to FIG. 2 but with the cutter removed, and with the guide plate in the elevated position which it occupies during the insertion of the securing disc.

FIG. 6 is a detail section through a portion of carpeting that has been completely repaired and showing the final relationship of the elements involved.

Referring to the drawing more particularly and by reference characters, A designates the pile of a carpet having the customary woven base element B resting upon a pad or floor C. In practically all types of carpeting the base material is of fairly uniform thickness, i.e., about one-eighth inch, but the thickness of the upper layer of material, herein referred to as pile, will vary considerably depending upon materials used and qualities selected. In some types of carpeting the pile shows up in distinctive rows and in such instances it is highly desirable that an inserted section have its rows in parallel alignment with those about and adjacent to it.

The main frame or guide plate 10 is shown of rectangular form and may be made of any suitably rigid plastic, wood or metal material. At its opposite ends it is provided with lugs 11 swingably receiving a pair of leg frames 12.

At a central point the plate 10 is provided with an aperture 13 in which is releasably fitted a flanged adapter ring 14 having a central coaxial opening 15, adapted to rotatably and slidably receive a tubular cutter 16. In practice it is preferable to provide a series of two or more interchangeable adapter rings all of which will have identical outer diameters but will have different internal diameters to selectively accommodate a corresponding series of cutters with differing diameters. In this way a cutter of minimum diameter can be used so that no more of the damaged part of the carpet need be removed than absolutely necessary.

The cutter 16 has a serrated lower cutting edge which, however, is of undulated contour so as not to present any sharp points and so that it can be oscillated down through the material until the operator feels that it is clearly through the base layer B. The cutter surface may be provided with scale lines 17 that will indicate the total depth of cut.

At its upper end the cutter is of necessity provided with a handle or other power connection (not shown) which may be like that shown at 17 in my application Ser. No. 650,927. Another form of handle by which oscillating and downward pressures can be applied is a cross handle of the type conventionally used at the end of common shovels.

The guide plate 10 is provided, at opposite sides of the cutter, with a pair of upstanding integral bearings 18 in which are threaded lift screws 19. Only two such screws are here indicated, but additional screws may be used, and only one of them is detailed, as in FIGS. 2 and 5.

Each screw unit 19 has a straight or non-tapered upper shank portion 20 that is threaded to screw in the upper end of bearing 18, the turning being done by manual operation of a knurled head 21. The lower end 22 of the unit 19 is threaded and tapered, like a wood screw, and its function is to screw down tightly into the base layer B so as to form a lifting connection with this part of the carpet.

The reason for extending the bearing 18 above the level of the plate 10 is to give adequate vertical movement to the screw, which is necessary for various thicknesses of carpeting, and it should also be noted that the threads of the tapered portion 22 are of faster pitch than those of the shank 20 so that as the screw is turned down it will not only establish anchoring engagement in the base material but will pull this area of the carpeting up into close contact with the plate 10. This is of particular importance when the carpet is to be lifted into spaced position above the pad or floor, as shown in FIG. 5, to permit insertion of the securing disc.

With an experienced operator the mere cutting out of the damaged carpet section, or in fact the removal of the undamaged section, which is to be substituted for it, may not always necessitate the use of the guide plate 10, even though its employment will invariably produce more efficient results.

The principal function of the plate is to provide means for lifting the carpeting from its supporting surface and holding it there during the remaining operation.

If we assume then that the cutter 16 has been operated, with or without the plate 10, to not only remove the damaged section of carpeting but also to cut out an undamaged section, the next step is to insert sleeve 23 in the space vacated by the damaged section. This sleeve is preferably of trunco-conical form, as shown, it may be adjustable as to size (as 29 in Ser. No. 650,927), and may be of any suitable material providing it is sufficiently rigid to hold the surrounding pile away from the opening, and guide the adhesive disc that is to be projected down through it. If the guide plate has been used in the cutting operation then the adapter ring 14 will have been removed as shown in FIG. 3.

With the damaged and undamaged cores of carpeting having been cut, with the sleeve 23 inserted, and with the plate 10 in its properly indexed position around the sleeve, the screws 19 are turned down until they firmly engage the base material of the underlying carpeting so as to pull it up firmly against the plate.

The operator then grasps and lifts the plate 10 while simultaneously forcing the leg frames 12 down through the underlying pile and into firm contact with the base layer B where the legs will temporarily anchor themselves against spreading and with the carpeting lifted to create the horizontal space 24 under sleeve 23.

The operator then selects a piece of sheet material 25, preferably in the form of a pre-cut disc having a size somewhat greater than the diameter of the hole that has been cut in the base material B, so that it will project thereunder, and the upper surface of this disc is provided with an adhesive so as to firmly bond it to the base material areas with which it comes in contact.

In order to manipulate the disc 25 down through the sleeve 23 and into the space 24, and to aid in properly centering it below the sleeve, it is impaled on the end of a spindle 26 having a threaded point 27 at its lower end extending, however, from a shoulder 28 to prevent the point from being pushed too far through the disc. To facilitate manipulation of the disc down through the sleeve 23 the disc, because of its larger diameter, is provided with a series of peripherally spaced notches 29 (FIG. 4) that will permit the outer portion of the disc to flex upwardly during its downward movement. These notches are not of sufficient size, however, to interfere with or lessen the holding action of the adhesive which is, of course, only applied to the upper surface of the disc.

When the disc has been properly inserted and centered the raised carpeting is lowered to its normal level, by releasing the leg frames 12, and the spindle 26 is removed, leaving the disc in place. The new plug or section 29, previously cut from an undamaged piece of carpeting, is then inserted, with its pile rows in alignment with those of the surrounding area, the sleeve 23 is removed, and it is only necessary to then step down on the transposed section to force it into contact with the surface of the disc 25, to leave the operation completed as illustrated in FIG. 6.

The disc 25 does not, of course, have sufficient thickness to make any difference in the appearance of the repaired area, and it is found that the disc not only forms a firm bond between the newly connected based parts but leaves the finished product in a completely satisfactory condition both from the standpoint of wear and durability as well as that of appearance.

Having fully disclosed a preferred form of the present invention, what I claim to be new and desire to protect by Letters Patent is:

1. Apparatus for repairing spot damaged carpeting while the same is disposed on a floor comprising, a body member adapted to be placed on the carpeting about the spot and having an opening through which a cutter may be operated to remove the damaged section of carpeting, a vertically movable cutter disposed in and guided by said opening for cutting out said damaged section, means for releasably attaching the body member to the carpeting at spaced points about the opening whereby a portion of the carpeting about the hole may be raised above the floor to provide a limited space between carpeting and floor and without removing or raising the main body of carpeting from the floor, means supportable by the floor for releasably holding said portion of carpeting in its raised position while a patch securing means is inserted down through the opening into the aforesaid space.

2. The apparatus of claim 1 in which said attaching means includes one or more screw members threaded in the body member and having a threaded terminal portion adapted to releasably anchor itself in the carpeting material.

3. The apparatus of claim 1 in which the holding means includes adjustable leg members extending down from opposite ends of the body member.

4. The apparatus of claim 1 which includes a tapered sleeve-like element adapted to be inserted in the opening from which the damaged section of carpeting has been removed to hold pile about the opening in spread formation, and means operative to insert a securing disc down through said sleeve-like element and into the aforesaid limited space below the opening created by removal of the damaged section.

References Cited
UNITED STATES PATENTS

| | | | |
|---|---|---|---|
| 3,021,249 | 2/1962 | Skoog | 156—94 |
| 3,094,964 | 6/1963 | Witten et al. | 156—94 |
| 3,044,920 | 6/1962 | Dewar. | |

BENJAMIN A. BORCHELT, Primary Examiner

J. V. DORAMUS, Assistant Examiner

U.S. Cl. X.R.

156—94